(12) United States Patent
Ho et al.

(10) Patent No.: US 9,467,879 B2
(45) Date of Patent: Oct. 11, 2016

(54) AUTOMATED CLOSE-LOOP ELECTROMAGNETIC (EM) DATALINK TESTING

(71) Applicant: THE BOEING COMPANY, Chicago, IL (US)

(72) Inventors: Hai D. Ho, Chicago, IL (US); Daniel D. Nguyen, Chicago, IL (US); Brian Schultz, Chicago, IL (US); Robert F. Huber, Chicago, IL (US); Phu Le, Chicago, IL (US); Carl Chihak, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 67 days.

(21) Appl. No.: 14/613,048

(22) Filed: Feb. 3, 2015

(65) Prior Publication Data

US 2016/0227420 A1 Aug. 4, 2016

(51) Int. Cl.
*H04W 24/06* (2009.01)
*H04L 29/06* (2006.01)
*H04W 24/10* (2009.01)

(52) U.S. Cl.
CPC .......... *H04W 24/06* (2013.01); *H04L 63/0428* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 5,786,773 A * | 7/1998 | Murphy | ................... | G01S 19/07 340/947 |
| 7,245,725 B1 * | 7/2007 | Beard | .................... | G06F 1/3203 375/295 |
| 7,752,544 B2 * | 7/2010 | Cheng | ................... | A61B 5/0002 700/245 |
| 7,760,660 B2 * | 7/2010 | Conway | ................ | H04L 41/145 370/232 |
| 7,832,126 B2 * | 11/2010 | Koellner | ................. | E02F 3/304 37/348 |
| 7,844,424 B2 * | 11/2010 | Comair | ................... | G06N 3/004 345/419 |
| 7,937,248 B2 * | 5/2011 | Ihn | ........................ | G01N 29/043 702/35 |
| 8,180,057 B1 * | 5/2012 | Delaney | ................. | H03B 29/00 380/263 |
| 8,949,607 B2 * | 2/2015 | Boesgaard Soerensen | ............... | G06F 21/55 713/169 |
| 2002/0059053 A1 * | 5/2002 | Akita | ................... | G06F 17/5022 703/13 |
| 2003/0026357 A1 * | 2/2003 | Bartlett | ..................... | H04L 5/02 375/324 |
| 2003/0040307 A1 * | 2/2003 | Lemieux | ................. | H04L 1/243 455/425 |
| 2004/0107087 A1 * | 6/2004 | Fukui | .................. | G06F 17/5009 703/26 |
| 2006/0034481 A1 * | 2/2006 | Barzegar | ................ | H04H 20/76 381/401 |
| 2008/0220777 A1 * | 9/2008 | Kouadjo | ................... | H04K 3/65 455/435.1 |
| 2011/0292863 A1 * | 12/2011 | Braz | ...................... | H04B 7/155 370/315 |
| 2012/0155522 A1 * | 6/2012 | Custer | .................... | H04W 16/22 375/224 |
| 2012/0170658 A1 * | 7/2012 | Anderson | ............ | H04N 19/895 375/240.16 |
| 2015/0106623 A1 * | 4/2015 | Holman | ............... | H04L 63/0457 713/171 |
| 2015/0288919 A1 * | 10/2015 | Labosco | .................. | G09G 5/00 348/445 |

\* cited by examiner

*Primary Examiner* — Bunjob Jaroenchonwanit
(74) *Attorney, Agent, or Firm* — Vista IP Law Group LLP; Cynthia A. Dixon

(57) ABSTRACT

Systems, methods, and apparatus for automated close-loop electromagnetic (EM) datalink testing are disclosed. In some embodiments, the disclosed method involves routing, by a user simulator, at least one user input data and at least one user control command to a controller. The method further involves encrypting, by an encryption device(s), at least one user input data to generate at least one encrypted user input data. Also, the method involves transmitting, by a first radio, at least one encrypted user input data to a second radio via an EM signal(s); and receiving, by the second radio, at least one received encrypted user input data. Additionally, the method involves decrypting, by the encryption device(s), at least one received encrypted user input data to produce at least one received user input data. Further, the method involves processing, by the user simulator, at least one received user input data to generate a status report.

20 Claims, 4 Drawing Sheets

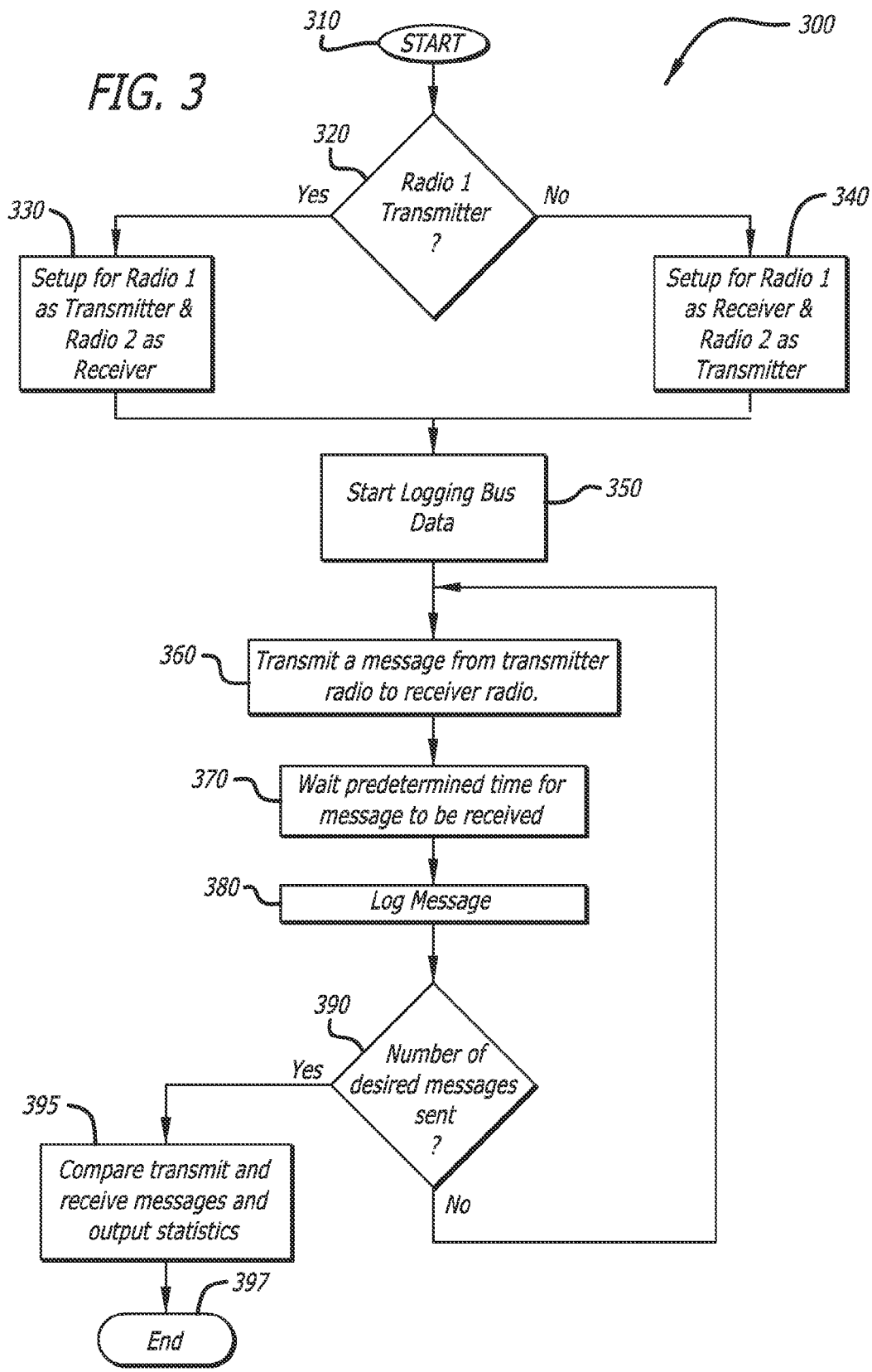

AUTOMATED CLOSE-LOOP ELECTROMAGNETIC (EM) DATALINK TESTING

GOVERNMENT LICENSE RIGHTS

This invention was made with Government support under Contract Number FA8614-06-D-2006 awarded by the Department of Defense. The U.S. Government has certain rights in this invention.

FIELD

The present disclosure relates to datalink testing. In particular, it relates to automated close-loop electromagnetic (EM) datalink testing.

BACKGROUND

Currently, testing strategies for aircraft communications radio suites include extensive manual lab testing following by flight testing. Typically, for commercial aircraft, the datalink (non-encrypted) is tested manually via Aircraft Communications Addressing and Reporting System (AGARS) Management Unit Simulation (AMUS) and Air Traffic Control (ATC) Communication Test Facility and Avionics System Test (ACTFAST) tools. If issues are found during testing, then additional software fixes may be required followed by more manual testing to verify any fixes and to ensure the integrity of the new software. One drawback is that insufficient data points may be tested in order to detect issues, which would remain latent only to be revealed once the product is in service. Another drawback is that the retesting of any new software builds may impact schedules and budget. Also, performing enough regression testing to ensure the integrity of the original software may not be feasible within the given schedule and budget.

As such, there is a need for a technique for automated close-loop electromagnetic (EM) datalink testing, which does not involve the need for manual testing.

SUMMARY

The present disclosure relates to a method, system, and apparatus for automated close-loop electromagnetic (EM) datalink testing. In one or more embodiments, a method for automated close-loop electromagnetic (EM) datalink testing involves routing, by a user simulator, at least one user input data and at least one user control command to a controller. The method further involves processing and routing, by the controller, at least one user input data and at least one user control command to at least one encryption device. Also, the method involves encrypting, by at least one encryption device, at least one user input data to generate at least one encrypted user input data. In addition, the method involves routing, by the controller, at least one encrypted user input data to a first radio. Additionally, the method involves transmitting, by the first radio, at least one encrypted user input data to a second radio via at least one EM signal. Also, the method involves receiving, by the second radio, at least one received encrypted user input data via at least one EM signal. In addition, the method involves decrypting, by at least one encryption device, at least one received encrypted user input data to produce at least one received user input data. Further, the method involves processing, by the user simulator, at least one received user input data to generate a status report based on results from the processing.

In one or more embodiments, the processing, by the user simulator, of at least one received user input data to generate the status report comprises comparing a user interface display of at least one received user input data with at least one user input data.

In some embodiments, after processing and routing, by the controller, at least one user input data and at least one user control command to at least one encryption device, the method further comprises: processing and routing, by the controller, at least one user control command to the first radio and the second radio.

In at least one embodiment, after encrypting, by at least one encryption device, at least one user input data to generate at least one encrypted user input data, the method further comprises: routing, by at least one encryption device, at least one encrypted user input data to the controller.

In one or more embodiments, after receiving, by the second radio, at least one received encrypted user input data via at least one EM signal, the method further comprises: routing, by the second radio, at least one received encrypted user input data to the controller.

In some embodiments, the method further comprises: routing, by the controller, at least one received encrypted user input data to at least one encryption device.

In one or more embodiments, after decrypting, by at least one encryption device, at least one received encrypted user input data to produce at least one received user input data, the method further comprises: routing, by at least one encryption device, at least one received user input data to the controller.

In at least one embodiment, after processing, by the user simulator, at least one received user input data to generate the status report based on the results from the processing, the method further comprises: routing, by the user simulator, the status report to a user interface.

In one or more embodiments, at least one EM signal is a radio frequency (RF) signal. In some embodiments, the RF signal is a very high frequency (VHF) signal, an ultra high frequency (UHF) signal, or a high frequency (HF) signal.

In one or more embodiments, a system for automated close-loop electromagnetic (EM) datalink testing involves a user simulator to route at least one user input data and at least one user control command to a controller, and to process at least one received user input data to generate a status report based on results from the processing. The system further involves the controller to process and to route at least one user input data and at least one user control command to at least one encryption device, and to route at least one encrypted user input data to a first radio. Also, the system involves at least one encryption device to encrypt at least one user input data to generate at least one encrypted user input data, and to decrypt at least one received encrypted user input data to produce at least one received user input data. In addition, the system involves the first radio to transmit at least one encrypted user input data to a second radio via at least one EM signal. Further, the system involves the second radio to receive at least one received encrypted user input data via at least one EM signal.

In at least one embodiment, the user simulator is further to compare a user interface display of at least one received user input data with at least one user input data.

In some embodiments, the system further involves a data bus connected to the controller, the first radio, the second radio, and the user simulator.

In one or more embodiments, the system further involves a discrete line connected to the controller, the first radio, the second radio, and at least one encryption device.

In at least one embodiment, the system further involves an audio line connected to the controller, the first radio, the second radio, and at least one encryption device.

In some embodiments, the system further involves an Ethernet line connected to the controller and at least one encryption device.

In one or more embodiments, at least one encryption device comprises a first channel and a second channel. In some embodiments, the first channel is associated with the first radio, and the second channel is associated with the second radio.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 3 depicts a flow chart depicting the disclosed method for effecting a machine-based determination of an automated close-loop electromagnetic (EM) datalink, in accordance with at least one embodiment of the present disclosure.

DESCRIPTION

Figure 1:
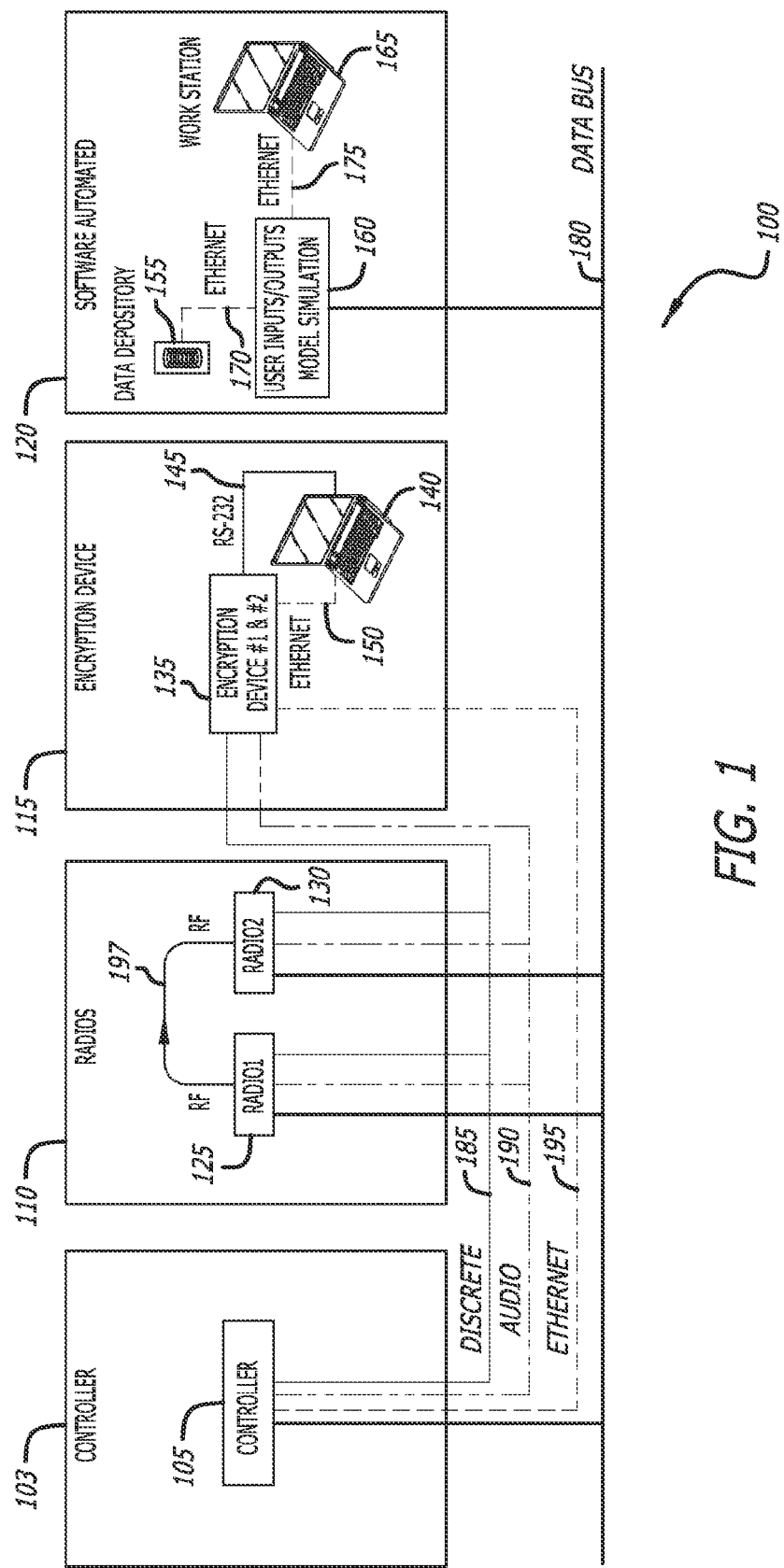
FIG. 1 is a diagram showing the disclosed system for automated close-loop electromagnetic (EM) datalink testing, in accordance with at least one embodiment of the present disclosure.

The methods and apparatus disclosed herein provide an operative system for automated close-loop electromagnetic (EM) datalink testing. The disclosed system provides an automated closed-loop datalink simulation test utilizing a software language (e.g., Automated Test Language (ATL)) to eliminate test steps that would otherwise require a human operator. The present disclosure solves the issue of being able to perform sufficient testing with real hardware to achieve system maturity and high reliability in a shorter time period compared to manual testing. Leveraging automation and minimizing human intervention also allows for the gathering and analysis of large amounts of data which can be used to identify interface issues and software bugs.

An exemplary testing of a C-17 aircraft communications radio suite (ARC-210 radio (VHF, UHF, and HF)/Data and Voice Encryption Unit (DVEU) system) using the present invention shows that the amount of data collected and analyzed from the testing was equivalent to the amount of data that would be transmitted over twelve (12) years of service. The initial test results indicated an 80% datalink transmission success rate, which eventually reached 100% for VHF/UHF and a 99.96% success rate for HF. Nearly 250K of datalink message transmissions were performed, which would be too costly and nearly impossible to perform manually.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with, and that the system described herein is merely one example embodiment of the present disclosure.

For the sake of brevity, conventional techniques and components related to datalink testing, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram showing the disclosed system 100 for automated close-loop electromagnetic (EM) datalink testing, in accordance with at least one embodiment of the present disclosure. In this figure, a controller 103 section, radios 110, an encryption device 115, and a software automated user simulator 120 are shown.

The controller section 103 employs a controller 105. The controller 105 may be implemented by any computer operated control unit comprising at least one processor. The controller 105 is configured to receive data and control commands from the user simulator 120 (and other devices), route data to various other devices accordingly, and to process received data.

The radios 110 comprise a first radio 125 and a second radio 130. In one or more embodiments, the first radio 125 is associated with the system 100 test setup and the second radio 130 is associated with an aircraft being tested. In other embodiments, the first radio 125 is associated with an aircraft being tested and the second radio 130 is associated with the system 100 test setup. In some embodiments, the first radio 125 is associated with a first aircraft and the second radio 130 is associated with a second aircraft.

The encryption device 115 is shown to include a single encryption device unit 135 connected to a user interface (e.g., a workstation and/or a laptop) 140, which may contain a display, via an RS-232 cable connection 145 and an Ethernet connection 150. It should be noted that in other embodiments, the encryption device unit 135 may be connected to the user interface 140 via various different means, including wire connections and/or wirelessly. The encryption device unit 135 is configured to both encrypt data and to decrypt data. In this figure, the encryption device unit 135 is a single device comprising two channels. Each of the two channels of the encryption device unit 135 is associated with an individual radio, respectively (e.g., the first channel is associated with the first radio 125 and the second channel is associated with the second radio 130).

The software automated user simulator 120 is shown to comprise a data depository (e.g., a database) 155 to store data, a user inputs/outputs model simulator 160 to generate and receive simulated user inputs and outputs, and a user interface (e.g., a workstation and/or a laptop) 165, which may contain a display. The data depository 155 is connected to the user inputs/outputs model simulator 160 by an Ethernet connection 170 and the user inputs/outputs model simulator 160 is connected to the user interface 165 by an Ethernet connection 175. It should be noted that in other embodiments, the data depository 155 may be connected to the user interface 165 via various different means, including wire connections and/or wirelessly. Also, it should be noted that in other embodiments, the user inputs/outputs model simulator 160 may be connected to the user interface 165 via various different means, including wire connections and/or wirelessly.

Also shown in this figure, a data bus 180 (e.g., a wire) is connected to the controller 105, the first radio 125, the second radio 130, and the user inputs/outputs model simulator 160 of the software automated user simulator 120. In addition, a discrete line 185 (e.g., a wire) is connected to the controller 105, the first radio 125, the second radio 130, and the encryption device unit 135 of the encryption device 115. Additionally, an audio line 190 (e.g., a wire) is connected to the controller 105, the first radio 125, the second radio 130, and the encryption device unit 135 of the encryption device 115. Further, an Ethernet line 195 (e.g., a wire) is connected to the controller 105 and the encryption device unit 135 of the encryption device 115.

During operation of the disclosed system 100 for automated close-loop electromagnetic (EM) datalink testing, a user on a user interface 165 of the software automated user simulator 120 sends commands to the user inputs/outputs model simulator 160 to initiate testing. The user inputs/outputs model simulator 160 utilizes a software language (e.g., Automated Test Language (ATL)) to perform the testing. The user inputs/outputs model simulator 160 sends (e.g., routes), via the databus 180, at least one user input data and at least one user control command to the controller 105. After the controller 105 receives at least one user input data and at least one user control command, the controller 105 processes and routes, via the audio line 190, at least one user input data and at least one user control command to the encryption device unit 135 of the encryption device 115. The controller 105 also processes and routes, via the Ethernet line 195 and the discrete line 185, at least one user control command to the first radio 125 and the second radio 130.

After the encryption device unit 135 receives at least one user input data and at least one user control command, the encryption device unit 135 encrypts at least one user input data to generate at least one encrypted user input data. Then, the encryption device unit 135 routes, via the audio line 190, at least one encrypted user input data to the controller 105.

The controller 105 then routes, via the audio line 190, at least one encrypted user input data to the first radio 125. After the first radio 125 receives at least one encrypted user input data, the first radio 125 transmits, via at least one (radio frequency) RF signal 197, at least one encrypted user input data to the second radio 130. In one or more embodiments, at least one RF signal 197 is a very high frequency (VHF) signal, an ultra high frequency (UHF) signal, and a high frequency (HF) signal. It should be noted that in other embodiments, other types of electromagnetic (EM) signals, other than an RF signal, for signal 197 may be employed, such as an optical signal.

The second radio 130 then receives at least one received encrypted user input data via at least one RF signal 197. Then, the second radio 130 routes, via the audio line 190, at least one received encrypted user input data to the controller 105. After the controller 105 receives at least one received encrypted user input data, the controller 105 routes, via the audio line 190, at least one received encrypted user input data to the encryption device unit 135.

After the encryption device unit 135 receives at least one received encrypted user input data, the encryption device unit 135 decrypts at least one received encrypted user input data to produce at least one received user input data. The encryption device unit 135 then routes, via the audio line 190, at least one received user input data to the controller 105.

After the controller 105 receives at least one received user input data, the controller 105 processes at least one received user input data to generate a user interface display. The controller 105 then routes, via the data bus 180, the received input data to the user inputs/outputs model simulator 160 for display on the user interface 165 of the software automated user simulator 120. Automated Test Language (ATL) on the user inputs/outputs model simulator 160 is used to process the user interface display of at least one received user input data to generate a status report based on the results from processing. In one or more embodiments, the processing comprises the user inputs/outputs model simulator 160 comparing the user interface display of at least one received user input data with at least one user input data.

Figure 2A:
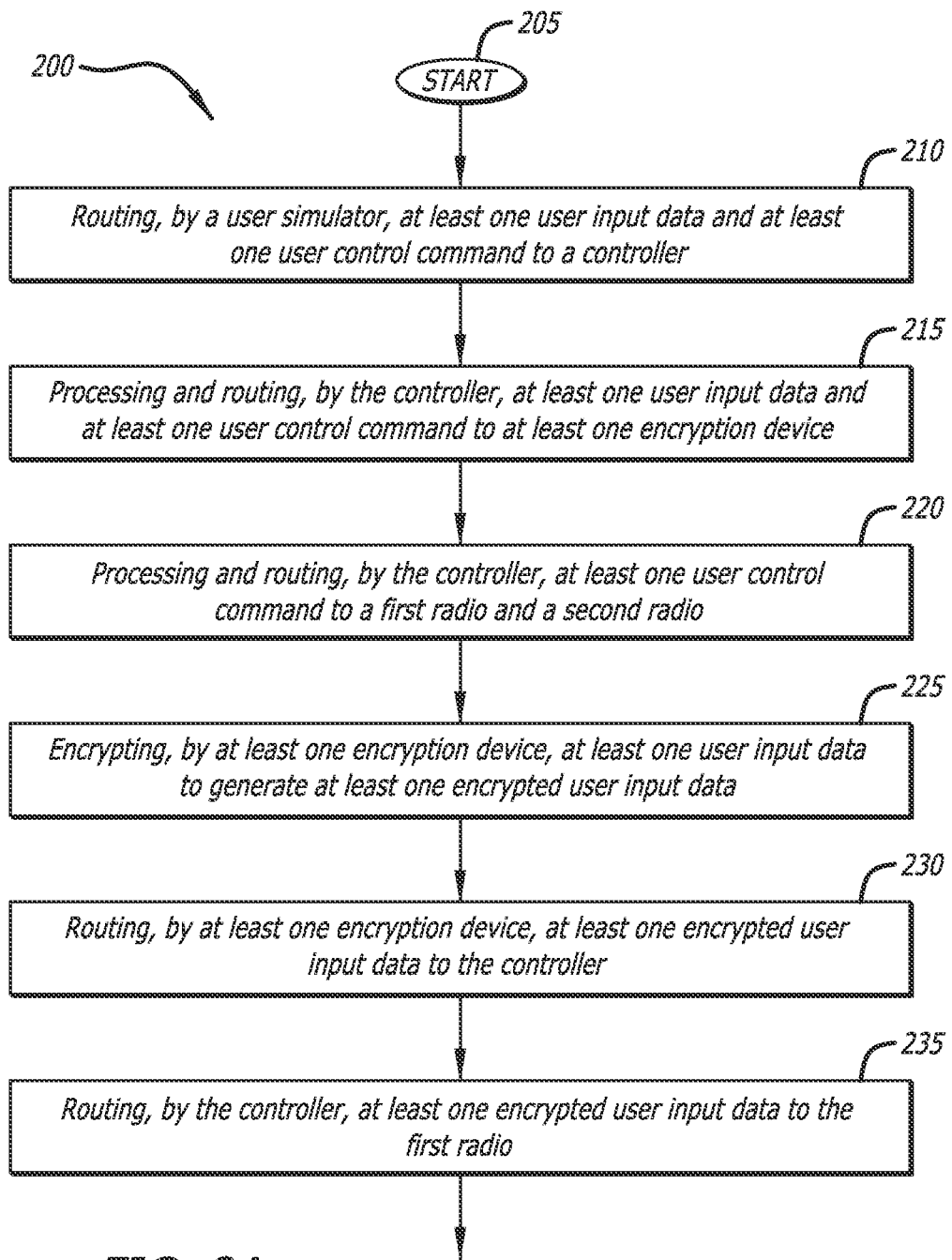
FIGS. 2A-2B depict a flow chart depicting the disclosed method for automated close-loop electromagnetic (EM) datalink testing, in accordance with at least one embodiment of the present disclosure.
Figure 2B:
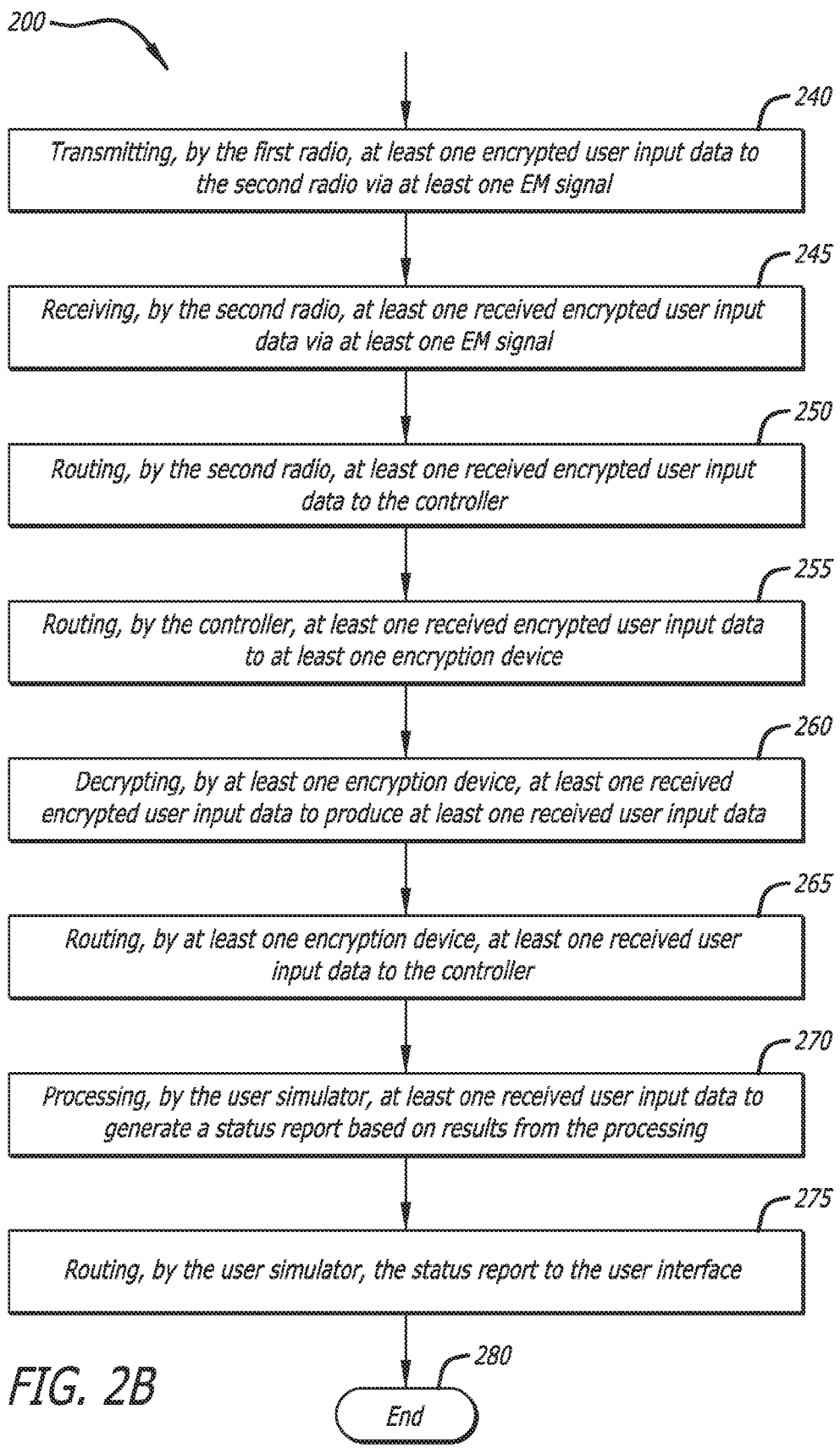

FIGS. 2A-2B depict a flow chart depicting the disclosed method 200 for automated close-loop electromagnetic (EM) datalink testing, in accordance with at least one embodiment of the present disclosure. At the start 205 of the method 200, a user simulator routes at least one user input data and at least one user control command to a controller 210. Then, the controller processes and routes at least one user input data and at least one user control command to at least one encryption device 215. The controller also processes and routes at least one user control command to a first radio and a second radio 220.

Then, at least one encryption device encrypts at least one user input data to generate at least one encrypted user input data 225. At least one encryption device then routes at least one encrypted user input data to the controller 230. Then, the controller routes at least one encrypted user input data to the first radio 235.

Then, the first radio transmits at least one encrypted user input data to the second radio via at least one EM signal 240. The second radio receives at least one received encrypted user input data via at least one EM signal 245. The second radio then routes the at least one received encrypted user input data to the controller 250. Then, the controller routes at least one received encrypted user input data to at least one encryption device 255.

Then, at least one encryption device decrypts at least one received encrypted user input data to produce at least one received user input data. 260. At least one encryption device then routes at least one received user input data to the controller 265. The user simulator processes at least one received user input data to generate a status report based on results from the processing 270. Then, the user simulator routes the status report to the user interface 275. Then, the method 200 ends 280.

FIG. 3 depicts a flow chart depicting the disclosed method 300 for effecting a machine-based determination of an automated close-loop electromagnetic (EM) datalink, in accordance with at least one embodiment of the present disclosure. This flow chart illustrates the method for effecting a machine-based determination of automated close loop encrypted datalink testing in a simulated environment to record, capture, and analyze to produce a critical statistics of successful transmit and receive datalink messages. Further analysis of the failed datalink message can then lead to software upgrades and fix issues detected. Continuous testing based on software upgrades can eventually lead to a mature software configuration for flight testing.

It should be noted that the method 300 is to be repeated n number of times. At the start 310 of the method 300, it is determined whether the first radio (i.e. radio 1) should be the transmitter or the receiver (i.e. Radio 1 transmitter?) 320. If yes (i.e. Radio 1 should be the transmitter), the first radio (i.e. Radio 1) is setup as the transmitter, and the second radio (i.e. Radio 2) is setup as the receiver 330. However, if no (i.e. Radio 1 should not be the transmitter, but rather be the receiver), the first radio (i.e. Radio 1) is setup as the receiver, and the second radio (i.e. Radio 2) is setup as the transmitter 340.

After the radios are setup, bus data will start to be logged 350. Then, a message is transmitted from the transmitter radio to the receiver radio 360. A predetermined amount of time is allowed to pass until the message is received 370. Then, the received message is logged 380.

Then, the number of desired messages sent is determined 390. If the number of desired messages sent has not been met, the method 300 proceeds to step 360. However, if the number of desired messages sent has been met, the transmitted messages are compared with the received messages, and resulting statistics from the comparison are outputted 395. Then, the method 300 ends 397.

It should be noted that although the above described system and method is performed for testing of communications radios of aircraft, the disclosed system and method may be performed for testing of communications radios of various different types of vehicles including, but not limited to, terrestrial vehicles (e.g., trucks, trains, and tanks), marine vehicles (e.g., ships and boats), and airborne vehicles (aircraft and satellites).

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for automated close-loop electromagnetic (EM) datalink testing, the method comprising:
    routing, by a user simulator, at least one user input data and at least one user control command to a controller;
    processing and routing, by the controller, the at least one user input data and the at least one user control command to at least one encryption device;
    encrypting, by the at least one encryption device, the at least one user input data to generate at least one encrypted user input data;
    routing, by the controller, the at least one encrypted user input data to a first radio;
    transmitting, by the first radio, the at least one encrypted user input data to a second radio via at least one EM signal;
    receiving, by the second radio, at least one received encrypted user input data via the at least one EM signal;
    decrypting, by the at least one encryption device, the at least one received encrypted user input data to produce at least one received user input data; and
    processing, by the user simulator, the at least one received user input data to generate a status report based on results from the processing.

2. The method of claim 1, wherein the processing, by the user simulator, of the at least one received user input data to generate the status report comprises comparing a user interface display of the at least one received user input data with the at least one user input data.

3. The method of claim 1, wherein, after processing and routing, by the controller, the at least one user input data and the at least one user control command to the at least one encryption device, the method further comprises:
    processing and routing, by the controller, the at least one user control command to the first radio and the second radio.

4. The method of claim 1, wherein, after encrypting, by the at least one encryption device, the at least one user input data to generate the at least one encrypted user input data, the method further comprises:
    routing, by the at least one encryption device, the at least one encrypted user input data to the controller.

5. The method of claim 1, wherein, after receiving, by the second radio, the at least one received encrypted user input data via the at least one EM signal, the method further comprises:
    routing, by the second radio, the at least one received encrypted user input data to the controller.

6. The method of claim 5, wherein the method further comprises: routing, by the controller, the at least one received encrypted user input data to the at least one encryption device.

7. The method of claim 1, wherein, after decrypting, by the at least one encryption device, the at least one received encrypted user input data to produce the at least one received user input data, the method further comprises:
    routing, by the at least one encryption device, the at least one received user input data to the controller.

8. The method of claim 1, wherein, after processing, by the user simulator, the at least one received user input data to generate the status report based on the results from the processing, the method further comprises:

routing, by the user simulator, the status report to a user interface.

9. The method of claim 1, wherein the at least one EM signal is a radio frequency (RF) signal.

10. The method of claim 9, wherein the RF signal is one of a very high frequency (VHF) signal, an ultra high frequency (UHF) signal, and a high frequency (HF) signal.

11. A system for automated close-loop electromagnetic (EM) datalink testing, the system comprising:
- a user simulator to route at least one user input data and at least one user control command to a controller, and to process at least one received user input data to generate a status report based on results from the processing;
- the controller to process and to route the at least one user input data and the at least one user control command to at least one encryption device, and to route at least one encrypted user input data to a first radio;
- the at least one encryption device to encrypt the at least one user input data to generate the at least one encrypted user input data, and to decrypt at least one received encrypted user input data to produce the at least one received user input data;
- the first radio to transmit the at least one encrypted user input data to a second radio via at least one EM signal; and
- the second radio to receive the at least one received encrypted user input data via the at least one EM signal.

12. The system of claim 11, wherein the user simulator is further to compare a user interface display of the at least one received user input data with the at least one user input data.

13. The system of claim 11, wherein the system further comprises a data bus connected to the controller, the first radio, the second radio, and the user simulator.

14. The system of claim 11, wherein the system further comprises a discrete line connected to the controller, the first radio, the second radio, and the at least one encryption device.

15. The system of claim 11, wherein the system further comprises an audio line connected to the controller, the first radio, the second radio, and the at least one encryption device.

16. The system of claim 11, wherein the system further comprises an Ethernet line connected to the controller and the at least one encryption device.

17. The system of claim 11, wherein the at least one EM signal is a radio frequency (RF) signal.

18. The system of claim 17, wherein the RF signal is one of a very high frequency (VHF) signal, an ultra high frequency (UHF) signal, and a high frequency (HF) signal.

19. The system of claim 11, wherein the at least one encryption device comprises a first channel and a second channel.

20. The system of claim 19, wherein the first channel is associated with the first radio, and the second channel is associated with the second radio.

* * * * *